United States Patent [19]
Burkholder et al.

[11] 4,073,839
[45] Feb. 14, 1978

[54] METHOD OF ZONE POURING FOAM PRODUCTS

[75] Inventors: Theodore B. Burkholder, Perrysburg; Robert J. Stalter, Bowling Green; Paul N. Skotynsky, Oregon, all of Ohio

[73] Assignee: The Goodyear Tire & Rubber Company, Akron, Ohio

[21] Appl. No.: 677,943

[22] Filed: Apr. 19, 1976

[51] Int. Cl.² ............................................. B29D 27/04
[52] U.S. Cl. ........................... 264/45.1; 239/597; 260/2.5 BC; 264/54; 264/250; 264/309; 425/DIG. 50
[58] Field of Search ............ 264/45.1, 45.5, 45.8, 264/51, 54, 250, 309; 260/2.5 BC; 239/597; 425/DIG. 50

[56] References Cited

U.S. PATENT DOCUMENTS

| | | | |
|---|---|---|---|
| 2,586,275 | 2/1952 | Toulmin | 264/45.8 |
| 3,009,209 | 11/1961 | Weinbrenner et al. | 264/54 |
| 3,081,487 | 3/1963 | Heffner et al. | 264/54 X |
| 3,139,369 | 6/1964 | Sullivan et al. | 264/45.8 X |
| 3,176,995 | 1/1975 | Bengtson | 264/51 X |
| 3,278,955 | 10/1966 | Freedlander et al. | 264/54 X |
| 3,563,474 | 2/1971 | Robinson | 239/597 X |
| 3,872,199 | 3/1975 | Ottinger | 264/54 X |
| 3,927,162 | 12/1975 | Stalter | 264/51 |

*Primary Examiner*—Philip Anderson
*Attorney, Agent, or Firm*—F. W. Brunner; J. D. Wolfe

[57] ABSTRACT

A foamed article having zones of varying hardness is prepared by moving a shaping means relative to at least two foam pouring means to distribute a foamable mixture over the surface of the shaping means in a fan-shaped pattern in response to the relative motion between the pouring means and the shaper, adjusting the fan-shaped pattern to define zones in the foamed article having the desired physical characteristics.

4 Claims, 2 Drawing Figures

METHOD OF ZONE POURING FOAM PRODUCTS

This invention relates to a method of making zone pours of polyurethane foam and to said product. More particularly, it relates to a zone poured mattress.

The problem of making foam articles having zones of different density and/or compression has been recognized for many years and the patent art (see U.S. Pat. No. 3,118,153 and 3,885,258) has provided various solutions to this problem. Also, the art has suggested using multiple pours or multiple pour heads with different foamable polyurethane reaction mixtures to give foamed articles having different density and usually different hardness. Unfortunately, these prior art solutions have required costly cutting and fabrication or the zones of different density were erratic and the interface between the zones were difficult to control. Thus, the zones of hardness or softness could not be controlled precisely.

One object of this invention is to provide a method for obtaining zoned poured foamed articles having precisely controlled zone interfaces.

Figure 1:
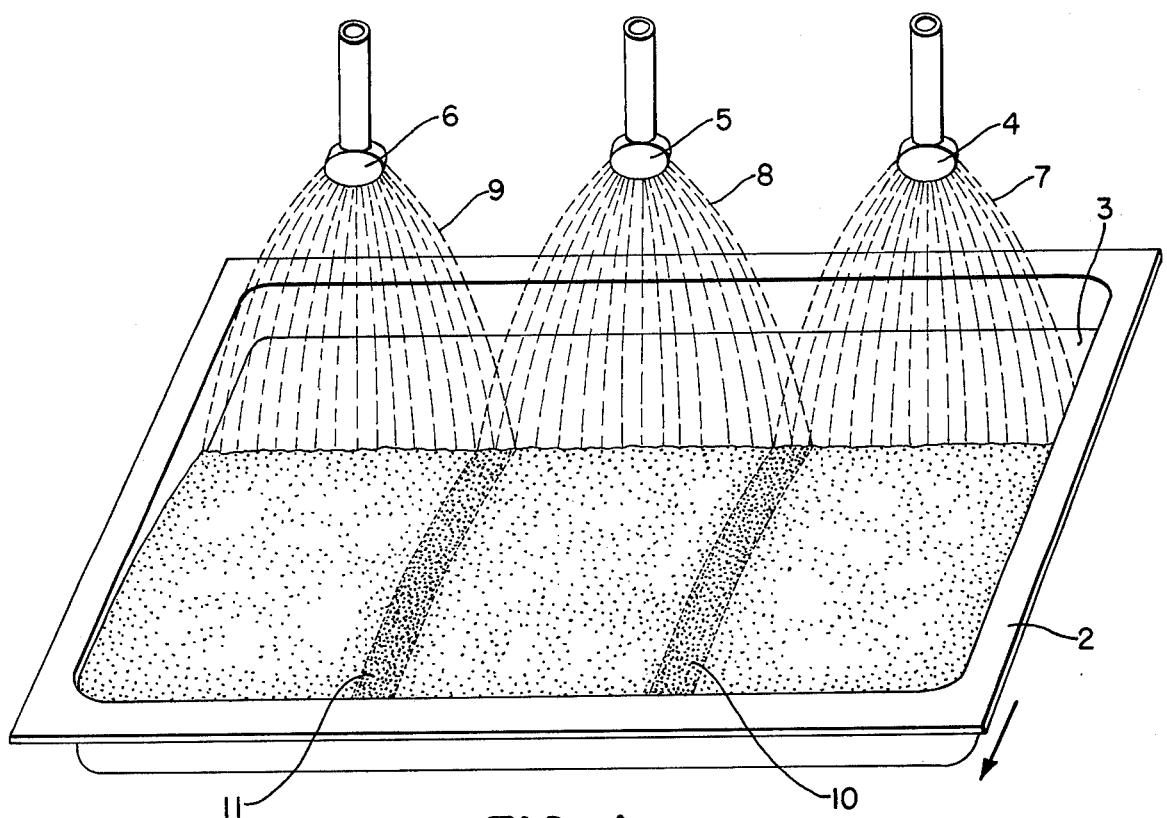
Figure 2:
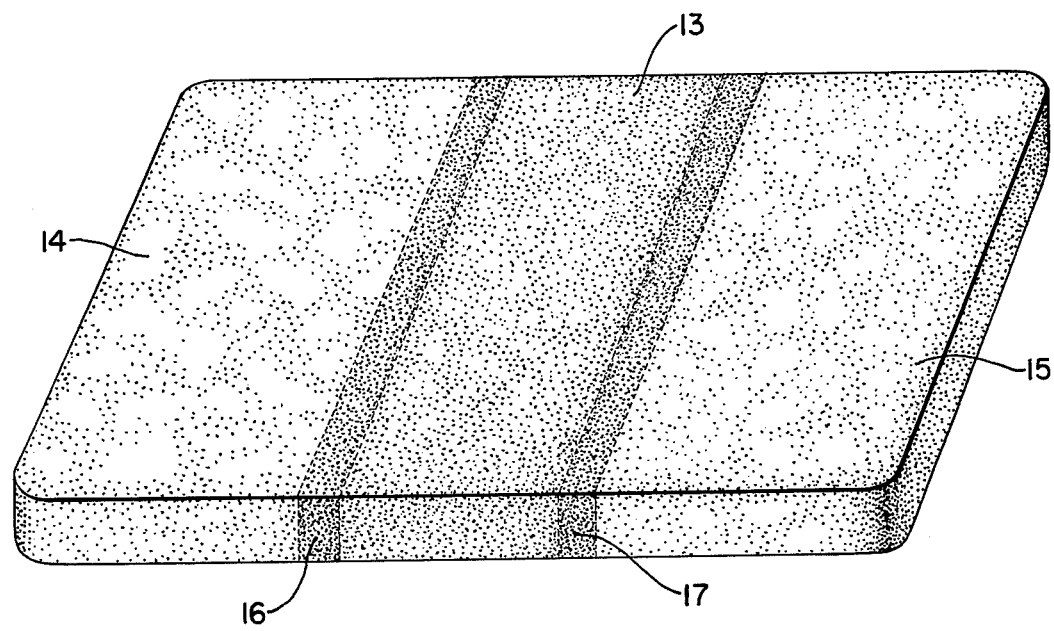

The object and advantages of this invention can be seen more readily by reference to the drawing where FIG. 1 shows a perspective view of a mold being poured with multiple pouring heads of the fan pour pattern type to produce a foamed article having zones of different densities and/or hardness, and FIG. 2 is a perspective view of a zoned poured foam mattress.

The objects and advantages of this invention can be obtained by pouring the foamable polyurethane reaction mixture over a pour surface (slab belt, mold, etc.) from multiple pour heads, said heads being equipped with fan pour nozzles to pour a stream in a fan pattern and each stream being of a specific composition to yield a foam of a specific density and compression characteristics with preferably a single directional movement of either the pour heads or of the pour surface.

The fan shape pour nozzle and foam equipment useful in practice of this invention is described in U.S. Pat. No. 3,927,162 and the teachings of this patent are incorporated herein by reference.

Referring to FIG. 1 the numeral 2 represents a pouring surface of the mold type having a rectangular cavity 3 moving past three in line pouring heads, each fitted with a fan type pouring nozzle, 4, 5 and 6 respectively. As the mold passes beneath the pour nozzles the pouring heads (not shown) are activated and a foamable liquid polyurethane reaction mixture of the high resiliency type described in U.S. Pat. No. 3,118,153 to Robert J. Stalter, Sr. is discharged into the cavity in the manner shown in FIG. 1. In this example th amount of blowing agent, viz. water and difluorodichloromethane is adjusted in the mixture exiting the pouring heads for nozzles 4 and 6 to give a cured foam of 2.5 density and a cured foam from nozzle 5 of 2.0 density. Also, the arc 7, 8 and 9 respectively of fan-like planular pour streams are adjusted to control the overlap in the zone interfaces 10 and 11 respectively and thus the transition area in the zone interface.

By controlling the arc and thereby the overlap it is possible to achieve a sharp line of demarcation, with zero overlap, or a transition area of desired with dependent on the width of overlap and thus an area of controlled size where the foam physical properties vary and also give the zone poured foam article a nice appearance free from bubbles and other defects.

Referring to FIG. 2, the mattress shown here was produced by adjusting the area of overlap of fan spray patterns 7 and 9 with spray pattern 8 to produce a firm zone 13 and soft ends 14 and 15. The areas of overlap 16 and 17 can be adjusted to essentially a line demarcation or half to one or more inches, depending on the product properties desired.

In the preferred embodiment the mold 2 is moved past the multiple pouring heads in the manner shown by the arrow in FIG. 1 to give essentially parallel demarcation zones.

While certain representative embodiments and details have been shown for the purpose of illustrating the invention, it will be apparent to those skilled in this art that various changes and modifications may be made therein without departing from the spirit or scope of the invention.

What is claimed is:

1. A method of forming a foamed article having zoned of varying hardness comprising moving a shaping means relative to a bank of at least two foam pouring means which are aligned in a direction transverse to the direction of relative movement of said shaping means, causing each of said pouring means to distribute a foamable mixture over the surface of the shaper in a fan-like planular pattern transverse to the direction of said shaping means in response to the relative motion between the pouring means and the shaper, adjusting the fan-like planular pattern between the adjacent pouring means to control the area of overlap of said patterns to define zones in the foamed article of different physical characteristics and adjusting the nature of the foamable mixture exiting each pouring means whereby a foamed article having different physical characteristic is formed.

2. The method of claim 1 wherein the foamable mixture is a polyurethane.

3. The method of claim 1 wherein the fan-like planular pattern from each pouring head is controlled to give a line of demarcation having from essentially a zero overlap to more than one inch.

4. The method of claim 2 wherein the fan-like planular pattern of each pour is adjusted to give essentially a parallel demarcation zone between the foams of different properties.

* * * * *